(12) United States Patent
Christenson et al.

(10) Patent No.: US 7,755,841 B2
(45) Date of Patent: Jul. 13, 2010

(54) LIQUID-LENS VARIABLE-CONTROL OPTICS IN ARRAY MICROSCOPE

(75) Inventors: Todd R. Christenson, Albuquerque, NM (US); Michael R. Descour, Tucson, AZ (US); Chen Liang, Tucson, AZ (US); Artur G. Olszak, Tucson, AZ (US)

(73) Assignee: Dmetrix, Inc., Tucson, AZ (US)

( * ) Notice: Subject to any disclaimer, the term of this patent is extended or adjusted under 35 U.S.C. 154(b) by 200 days.

(21) Appl. No.: 12/011,818

(22) Filed: Jan. 30, 2008

(65) Prior Publication Data

US 2008/0297911 A1    Dec. 4, 2008

Related U.S. Application Data

(60) Provisional application No. 60/898,215, filed on Jan. 30, 2007.

(51) Int. Cl.
*G02B 1/06* (2006.01)
*G02B 21/02* (2006.01)
*B29D 11/00* (2006.01)

(52) U.S. Cl. .................. 359/667; 359/665; 359/656; 264/1.7

(58) Field of Classification Search .......... 359/665–667
See application file for complete search history.

(56) References Cited

U.S. PATENT DOCUMENTS

| | | | |
|---|---|---|---|
| 6,369,954 B1 | 4/2002 | Berge et al. | |
| 6,934,090 B2 | 8/2005 | Nagaoka et al. | |
| 7,043,153 B2 | 5/2006 | Takeyama et al. | |
| 2006/0126190 A1* | 6/2006 | Berge et al. | 359/665 |
| 2007/0002455 A1* | 1/2007 | Berge et al. | 359/665 |
| 2007/0127102 A1 | 6/2007 | Obinata | |
| 2008/0247052 A1* | 10/2008 | Hendriks et al. | 359/666 |
| 2008/0266521 A1* | 10/2008 | Campbell | 351/233 |
| 2008/0316610 A1* | 12/2008 | Dobrusskin | 359/666 |
| 2009/0135484 A1* | 5/2009 | Weber et al. | 359/554 |

OTHER PUBLICATIONS

Benno Hendriks & Stein Kuiper, "Through a Lens Sharply," IEEE Spectrum, Dec. 2004, pp. 32-36.

* cited by examiner

*Primary Examiner*—Jordan M. Schwartz
(74) *Attorney, Agent, or Firm*—Antonio R. Durando

(57) ABSTRACT

A liquid lens includes a segmented electrode that allows the simultaneous application of different potentials across the lens's meniscus to obtain a predetermined aberration correction condition and to adjust focal length as necessary to conform to the topography of the object being scanned. The lens also includes a gas plenum interfacing with one of the liquids of the lens to allow for volume changes in the lens cell due to temperature variations. This combination of features produces a liquid-lens cell capable of maintaining substantially constant transverse magnification and diffraction-limited image quality over a useful range of focal length. As such, the lens is particularly suitable for incorporation in an array of micro-objectives used in a scanning microscope.

12 Claims, 15 Drawing Sheets

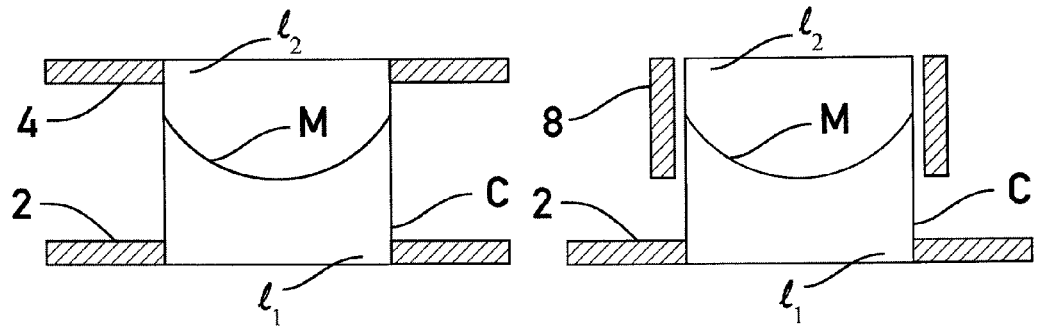
Fig. 1(a)
(PRIOR ART)
Fig. 1(c)
(PRIOR ART)
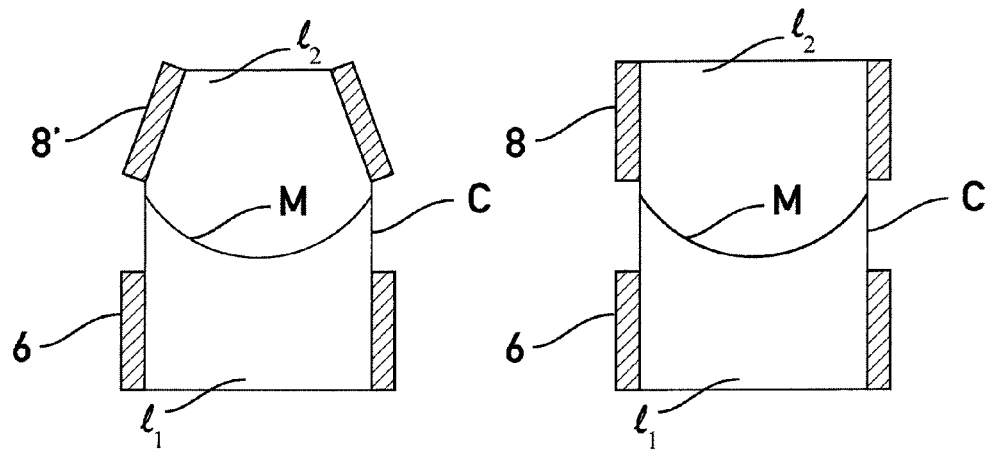
Fig. 1(b)
(PRIOR ART)

LIQUID-LENS VARIABLE-CONTROL OPTICS IN ARRAY MICROSCOPE

RELATED APPLICATIONS

This application is based on and claims the priority of Provisional Application No. 60/898,215, filed Jan. 30, 2007.

BACKGROUND OF THE INVENTION

1. Field of the Invention

This invention relates in general to the field of array microscopy and, in particular, to the use of variable-focus liquid lenses for providing programmable optics to correct aberrations, ensure uniform performance of the array, and focus dynamically during the scan of uneven surfaces.

2. Description of the Prior Art

Array microscopes image a sample surface by scanning linearly over the sample. The microscopes of the array acquire intensity data corresponding to adjacent strips of the sample surface, thereby providing a complete image of the sample with a single scan. Each microscope consists of a fixed combination of optical elements with the same design characteristics. Accordingly, each microscope exhibits the same optical performance, subject to tolerances and imperfections of manufacture, aberrations, and other variables. Therefore, such an array of passive imaging elements suffers from the limitation that its finite area is greater than the local variation of topography on the sample being scanned. For example, tissue mounted on a glass slide may exhibit topography changes that occur over a distance shorter than the width of the array. In that case, some of the imaging elements may be unable to focus on the tissue despite available degrees of freedom of the scanning mechanism, such as pitch, roll and vertical translation. A typical array microscope is described in U.S. Ser. No. 10/637,486.

It would be very desirable to provide independent focusing and/or corrective functionality to each microscope of the array. Such functionality may be provided with the use of a liquid-lens component in each microscope of the array. Current approaches for implementing variable liquid lenses are based on the use of three different electrowetting topologies, as illustrated in FIG. 1. The first approach, FIG. 1(a), was developed by Joseph Fourier University (see U.S. Pat. No. 6,369,954) and consists of a tubular structure C defining a lens cell connecting two annular, parallel, electrode plates, 2 and 4, positioned between two, polar and non-polar, immiscible liquids, $l_1$ and $l_2$, with different refractive indices. A lens meniscus M is formed in the structure C at the interface between the two liquids. The second approach, illustrated in two alternative embodiments in FIG. 1(b) and described in Olympus' U.S. Pat. No. 6,934,090, uses a tubular structure C connecting two axially stacked electrode cylinders, 6 and 8 (or 8'), placed about the two liquids $l_1$, and $l_2$. Yet a third configuration, described in Philips' U.S. Pat. No. 7,126,903, uses a combination of the two approaches with the tubular structure C connecting a cylinder 8 aligned axially with an annular plate 2, as shown in FIG. 1(c). This configuration has been implemented in a variable-focus camera/phone device described by B. Hendriks et al, in an article entitled "Through a Lens Sharply," IEEE Spectrum, December 2004, pages 32-36. This article also proposes the segmentation of the top electrode in order to tilt the meniscus and thus enabling imaging in directions at an angle with the lens axis.

The present invention builds upon this prior art with a novel approach that affords a greater degree of flexibility than prior-art liquid lenses to conform each microscope's performance to a desired set of specifications. In addition to adjusting the focus of each microscope on the fly to conform to variations in the sample surface, the invention allows for corrective action to be taken dynamically during use of the array microscope, thereby allowing total flexibility and programmable versatility to correct for aberrations in the array so that the various microscopes perform uniformly.

BRIEF SUMMARY OF THE INVENTION

The heart of the invention lies in a novel combination of features that make it possible to construct a liquid-lens cell that can be controlled to correct fabrication aberrations and to adjust the lens's focal length over a useful range while maintaining substantially constant transverse magnification and diffraction-limited image quality. As such, the lens of the invention is particularly suitable for incorporation in an array of micro-objectives used in a scanning microscope.

One important feature of the lens is a segmented electrode that allows the simultaneous application of different potentials across the lens's meniscus to obtain a predetermined correction condition and to adjust focal length as necessary to conform to the topography of the object being scanned. The gap between electrode segments is minimized in order to maintain a substantially uniform field at the points of discontinuity, preferably keeping the gap between segmented components at no more than one third the thickness of the insulating layer separating the electrode from the lens liquids.

Another critical feature of the lens of the invention is a gas plenum interfacing with one of the liquids of the lens to allow for volume changes in the lens cell due to temperature variations. This feature enables the use of a wide variety of manufacturing materials and therefore eases the constraints for the design characteristics of the lens. Even more importantly, the feature guarantees structural integrity and predictable optical performance over the range of temperatures typical for commercial applications.

The lens may be fabricated in a sequence of steps suitable for mechanized implementation maintaining high precision at very small scale levels. Accordingly, the process of manufacture is particularly suitable for constructing arrays of liquid lenses that can then be incorporated into arrays of additional optical elements to form an array of micro-objectives. The liquid lens is preferably located at the rear focal plane, coincident with the objective's aperture stop, in order to maintain a substantially constant numerical aperture and the transverse magnification.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

BRIEF DESCRIPTION OF THE DRAWINGS

FIG. 1(a) is a schematic representation of the configuration of a variable-focus liquid lens described in U.S. Pat. No. 6,369,954.

FIG. 1(b) is a schematic representation of the configuration of a variable-focus liquid lens described in U.S. Pat. No. 6,934,090.

FIG. 1(c) is a schematic representation of the configuration of a variable-focus liquid lens described in U.S. Pat. No. 7,126,903.

DETAILED DESCRIPTION OF THE INVENTION

Figure 2A:
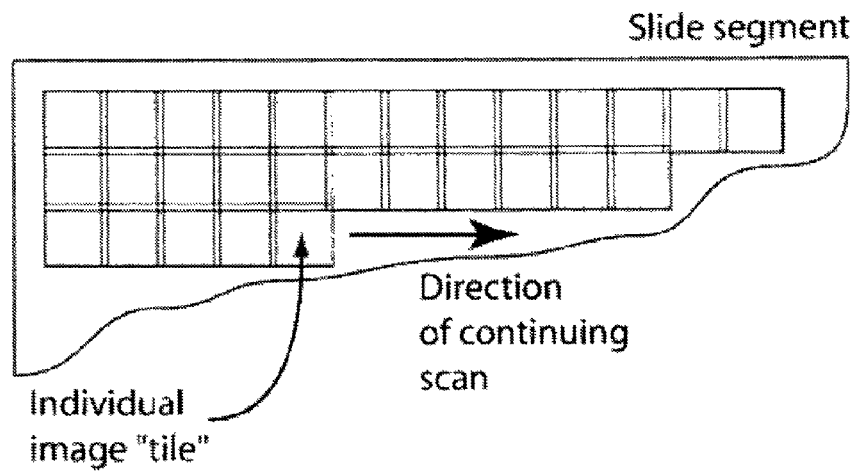
FIGS. 2(a) and 2(b) are schematic depictions of the two slide-imaging approaches mainly used in the art. Part (a) shows the step-and-repeat approach. Part (b) shows the "push-broom" approach.
Figure 2B:
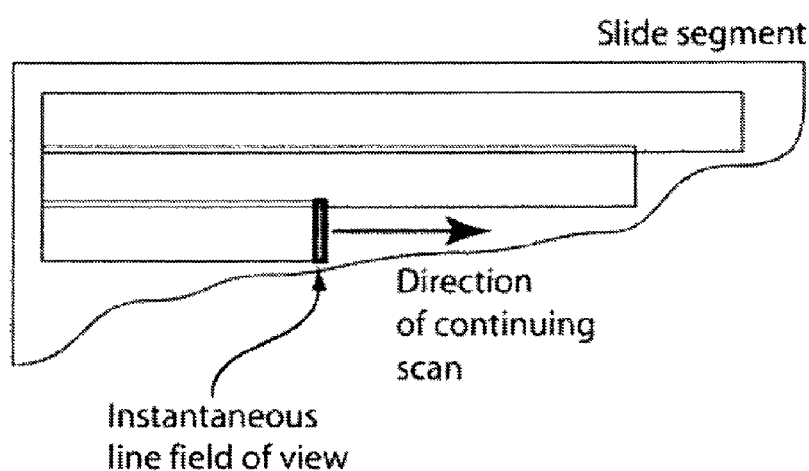

Existing microscope optics enable two principal image-acquisition approaches. These approaches are represented in every whole slide scanning system available commercially. There is a "step-and-repeat" approach in which individual image fields (also known as "tiles") are recorded and the stage bearing the microscope slide is advanced to the next field, as illustrated in FIG. 2(a). For a typical 20× field-flattened objective, this approach results in several thousand image fields for a 20 mm by 50 mm virtual slide, depending on how much field overlap is provided and whether a complete record of the slide is made. The other approach is to use a linear detector array covering the diameter of the field of view of the microscope objective. This results in a swath that could cover the entire width of a slide, to be repeated, after a step-over, for a 50 mm long slide (typically 50 times). This approach, illustrated in FIG. 2(b), is sometimes referred to as "push-broom" scanning.

Both of these image-acquisition approaches typically require an overlap between the individual tiles or the swath scans. The overlap is used to ensure complete imaging coverage of the region of interest. Stitching of image tiles or swaths may require additional computation to determine the extent of redundant image data.

A major problem associated with conventional digital imaging of microscope slides is the slow image-acquisition rate. A full microscope slide can require tens of minutes to hours to image at a useful spatial resolution. The objective of the invention is to meet the accelerating need for a high-throughput, highly automated microscope-slide scanner solution that will enable an economical application of information technology and telecommunications to pathology. The focus of this invention is the development of a next-generation, uniquely flexible array-microscope instrument for rapid imaging, applicable in brightfield and epi-fluorescence imaging modalities.

The approach proposed in this disclosure is based on the use of a multiple-electrode liquid-lens cell that is constructed via a high aspect-ratio precision batch micro-fabrication process. The liquid-lens cell is suitable for the simultaneous fabrication of closely spaced liquid lens arrays.

A primary use of the optical system contemplated by the invention is the ultra-rapid and accurate imaging of tissue and tissue-microarray (TMA) glass slides. This optical system will allow scanning of a microscope slide in a single sweep at a minimum numerical aperture of NA=0.65, covering the entire width and length of a slide with 0.23-elm sampling. At the core of the instrument is an array of 120 miniaturized objectives, as illustrated with fewer objectives in FIG. 3(a), each objective measuring approximately 2 mm in diameter and 8 mm in length. The rows of lenses in the array microscope 10 are staggered with respect to the direction of scan S and image frames are acquired during the scan across the object 12 such that each of the optical systems 14 images a respective field of view 16 and acquires images corresponding to a respective continuous strip of the object along the direction of scan (illustrated as A and B in the figure).

Figure 3A:
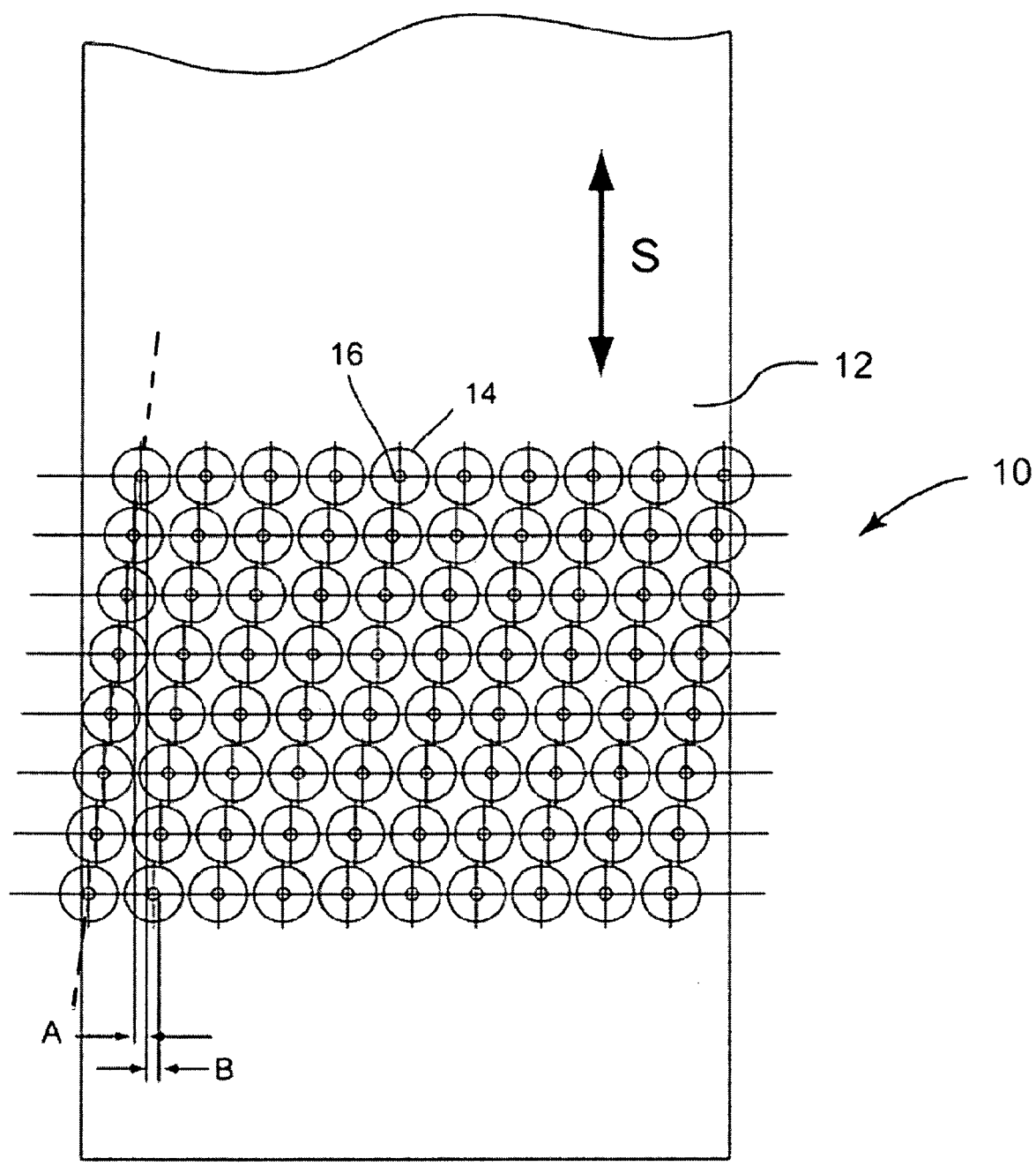
FIG. 3(a) illustrates in plan schematic view the staggered-row layout of the microscope array used to practice the invention.

According to the invention, each objective is individually focusable using a liquid lens of novel design made from two immiscible liquids with different indices of refraction and contained in a miniature cup or cell, as described below. The meniscus-shaped interface between the liquids is a high-quality, electrically controllable optical surface. As a result, all individual objectives in the array can continually and rapidly adjust to focus on the translating specimen during each scan. The objectives are organized in slightly staggered rows in the array, as shown in FIG. 3(a), so as to produce a single, seamless sweep of the slide, as described in detail in Ser. No. 10/637,486.

Current array-microscope commercial products (such as DMETRIX®'s DX-40 system) are very rapid. For example, a microscope slide area of 15 mm×15 mm can be scanned in less then 60 seconds at 0.5-µm sampling for three-color acquisition mode and in less than 20 seconds in single color mode. A full slide can be scanned in 2.5 minutes at 0.5-µm sampling, nearly 10 times faster than single-objective scanners. Image acquisition by means of the array microscope results in a gain in scanning speed of a factor of 5-60 over any single-objective system. The application of liquid-lenses according to the invention to the array microscope will produce the fastest and most accurate imaging of biological specimens, even at high numerical aperture and sub-micron depth of field.

Liquid lenses are most suitable for demanding microscopy applications because of the very high quality of the spherical optical surfaces formed at the interface of the liquids, as confirmed by the literature. See B. H. W. Hendriks, S. Kuiper, M. A. J. Van As, C. A. Renders, and T. W. Tukker, "Electrowetting-based variable-focus lens for miniature systems," *Optical Review*, 12, No. 3, pp. 255-259 (2005). Measuring liquid-lens wavefront-aberration with a Twyman-Green interferometer, these authors found that liquid lenses of similar dimensions to those proposed here produce a meniscus shape that differs from an ideal sphere by less than 0.07 waves rms (root mean square). A surface deformation of such small magnitude means that liquid lenses are highly suitable for use in microscope optics. See M. Born and E. Wolf, *Principles of Optics*, $6^{th}$ Edition, Ch. 9, p. 469 (Pergamon Press, 1989). For comparison, the surface shape tolerance on the liquid-meniscus surface in the preliminary design for the present invention shown of FIG. 8 below is 0.5 waves rms.

Figure 3B:
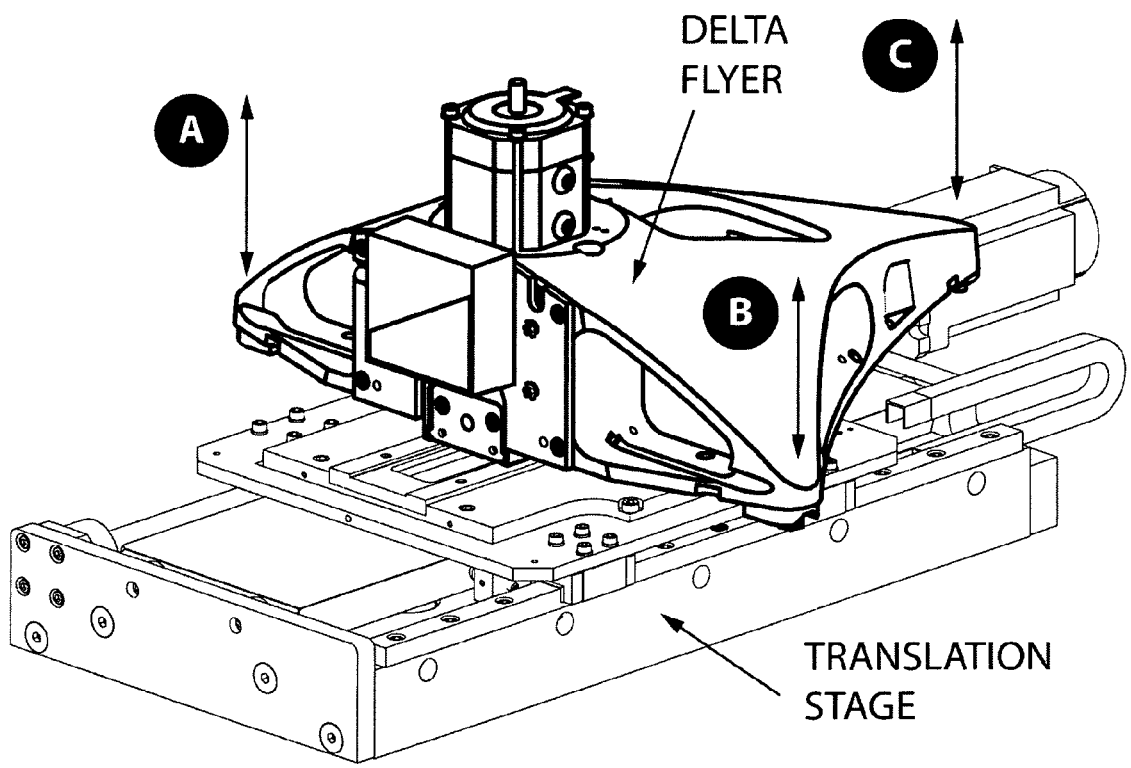
FIG. 3(b) is a schematic illustration of array-microscope dynamics during imaging. The corners associated with the arrays labeled "A," "B," and "C" in the so-called "Delta Flyer" are raised or lowered by means of precision elevator stages continuously during the scan of a slide. The motions "A-C" therefore can achieve a combination of a roll, pitch, and vertical translation of the array-microscope optics and image sensor assembly mounted on the bottom of the Delta Flyer.

None of the variable-lens technologies available today is practical for the high-throughput slide scanner intended for pathology clinical and research applications. In order to maintain focus at all objectives in the array, the current brightfield array of the DMETRIX® company controls the pitch, roll, and elevation of the array of objectives relative to the glass slide [see FIG. 3(*b*)]. In effect, the objectives "fly in formation" while following an optimal trajectory that conforms to the topography of the imaged specimen. The particulars of the underlying glass slide, the mounting medium and the coverslip are collectively compensated by the trajectory. The actual pitching, rolling, and vertical translation movements ["A," "B," and "C" in FIG. 3(*b*), respectively] are achieved by means of three precision elevator stages that are continually adjusted during scanning in synchrony with the movement of the glass slide. This approach is used on all current array microscopes.

Since no two slides are identical, a unique trajectory is first determined by the array microscope for each slide. That is part of a pre-scan procedure. Determination of the trajectory is uniquely accomplished using all objectives in the array based on the method outlined in U.S. Patent Publication No. 20040223632 (Nov. 11, 2004). The array microscope actually derives the topography of the tissue on the glass slide, accounting for variations of the coverglass and mounting medium. That topography is then translated into appropriate commands to the "A," "B," and "C" elevator stages that are executed concurrently with the translation of the glass slide relative to the array of objectives. Since all objectives are used to determine the trajectory, even isolated tissue segments are in focus. Tissue folds or bubbles in the mounting medium pose no problem because the majority of objectives detect properly placed tissue.

Currently, when the specimen's topography changes quickly over short distances, the array microscope can adopt a different strategy, such as a series of scans separated by a short vertical step size. One approach that has been employed successfully involves raising or lowering the nominal trajectory in steps of a fraction of a micron and repeating the scan. However, this approach requires repeated measurements at the expense of speed and efficiency.

According to the present invention, a significant improvement lies in the ability to track the tissue or specimen topography in a single scan. The liquid-lens approach affords both the flexibility of a single-lens slide scanner (which, however, comes at the price of very low throughput measured in slides/hour) and the high speed of image acquisition possible with the parallel imaging approach characteristic of the array microscope. As a result, a specimen topography that would normally require a series of scans separated by a vertical step can instead be scanned in only one pass by individually adjusting the focus of each objective in the array during the scan.

Figure 4:
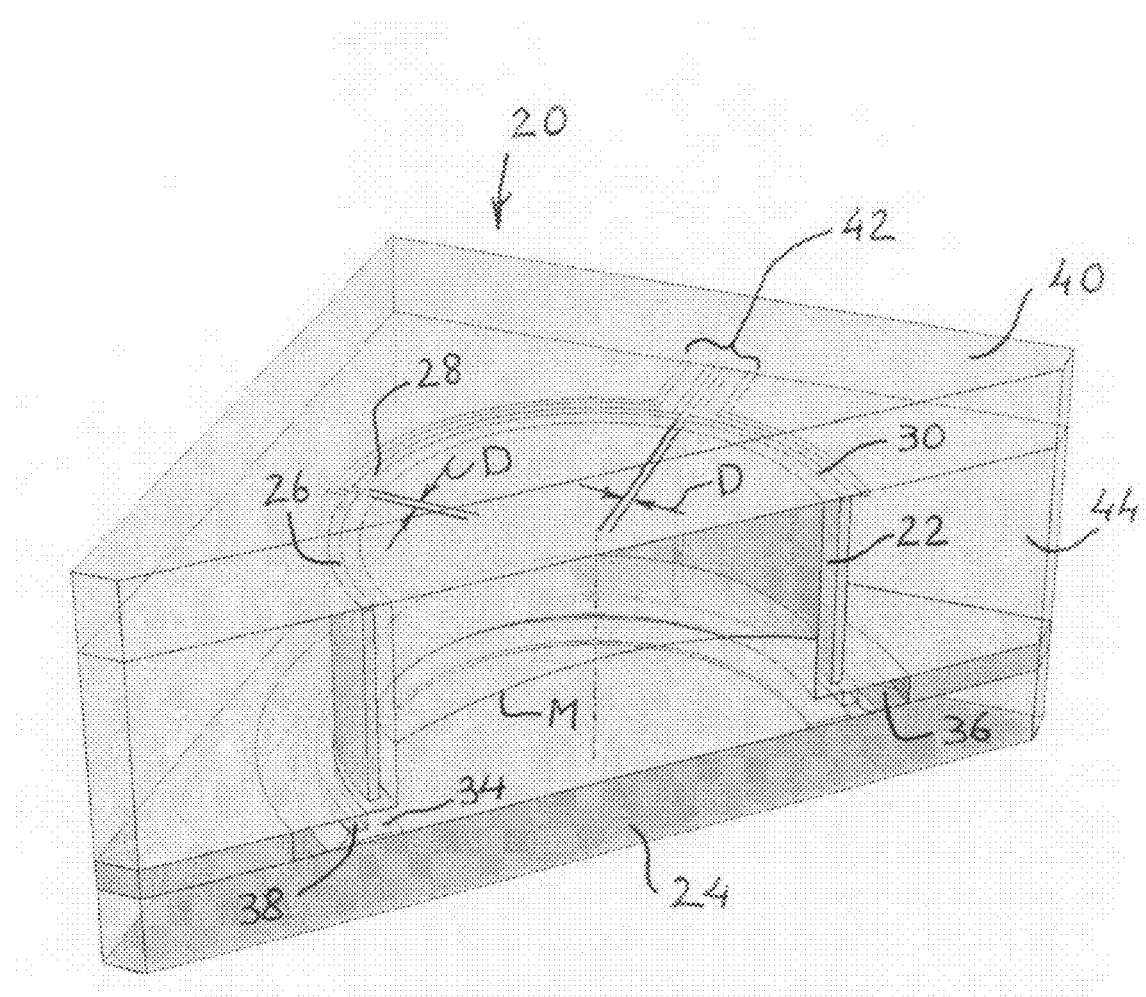
FIG. 4 is a model of a liquid-lens cell according to the invention. The cutaway view shows a 4-electrode liquid-lens cell design. The gas plenum serves to accommodate liquid expansion with temperature. The lower electrode ring defines the aperture stop of the liquid lens miniature objective.

The liquid lenses developed according to the present invention for use in array microscopy differ from the prior art in several important respects. Individually addressable, segmented lateral electrodes are used within each liquid-lens cell, as illustrated in FIG. 4, not to tilt the imaging direction but to correct aberrations and dynamically adjust the lens' focal length. The individual electrodes permit to change the wettability of the cell's inner surface around the cell's circumference. As a result, it is possible to compensate for fabrication non-uniformities and improve the shape of the meniscus surface. It is anticipated that the meniscus may be deformed into an asymmetric shape (i.e., a cubic surface) to achieve extended depth of field imaging. Unlike prior liquid-lens embodiments, these liquid lenses can be micro-fabricated in an array format, which renders them further suitable for array microscope applications.

As illustrated in the liquid-lens cell of FIG. 4, the invention is preferably implemented in the configuration of FIG. 1(*c*), wherein each liquid-lens cell 20 is defined by an insulating inner sleeve or coating layer 22 and a bottom clear plate 24. The cell contains two immiscible liquids, $l_1$ and $l_2$, of different refractive indices that form a meniscus M within the sleeve 22, as well understood in the art. The sleeve is surrounded by a top cylindrical electrode that consists of a plurality of segmented electrode arcs 26,28,30 [i.e., cylinder segments; four are used for illustration—only three are visible in the partial view of the figure; segment 32 is seen in FIG. 7(*b*)]. A single-component annular electrode 34 is preferably used at the bottom of the lens cell. According to the invention, by varying the voltages applied to each, these segmented electrode arcs allow tailoring of the shape of the lens meniscus to correct for aberrations.

Figure 5:
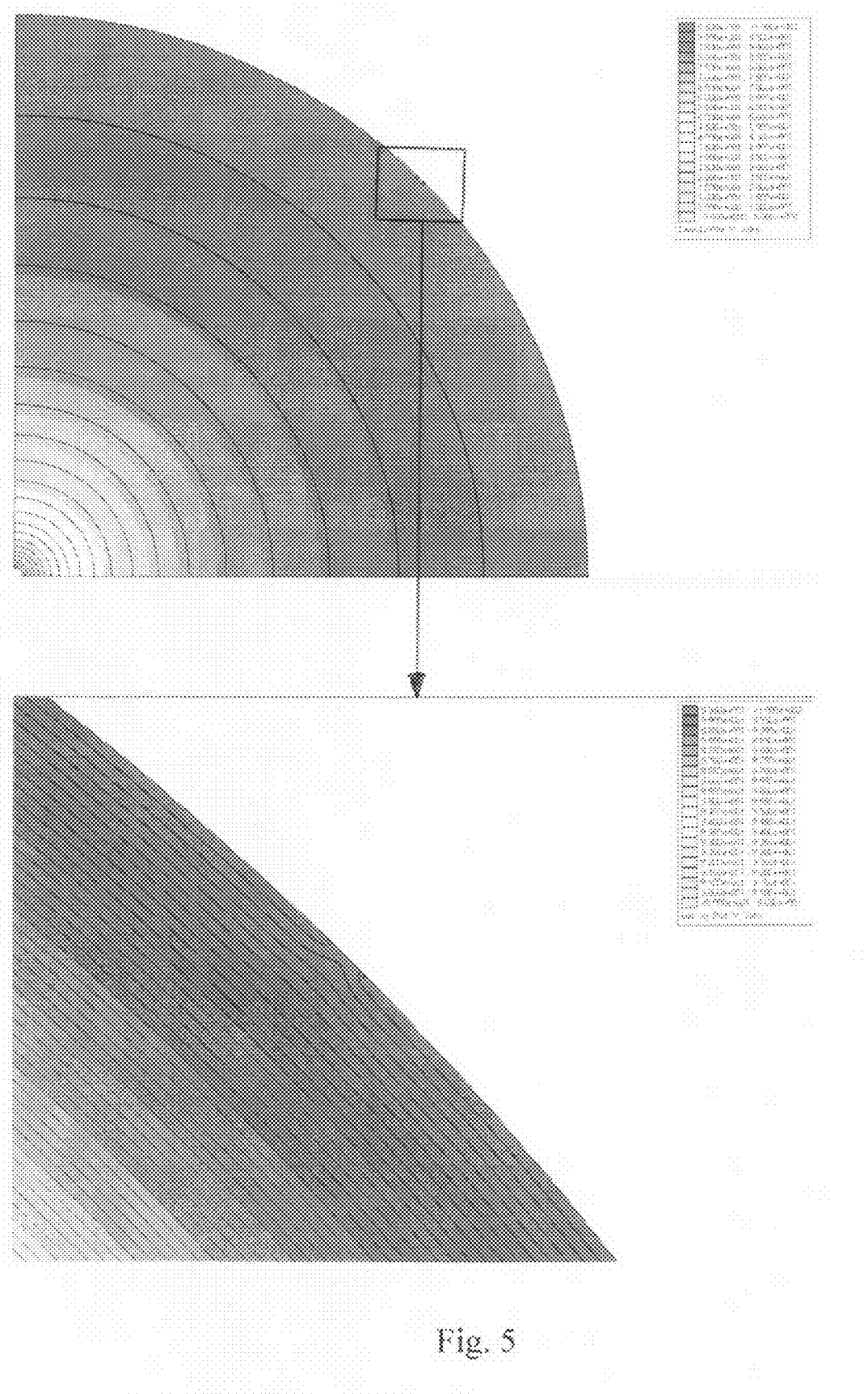
FIG. 5 illustrates a cross-sectional potential field map of a multiple-electrode liquid-lens cell showing a slightly perturbed potential field due to a discontinuous outer electrode. The applied cell potential is 100 Volts with a cell diameter of 1.2 mm and an electrode separation of 10 micrometer.

One possible problem with this multiple-electrode approach lies in the fact that the potential at each radial position (i.e., along the circle defined by each distance from the center of the circular section of the electrode) in the interior of the insulating cylinder sleeve or coating 22 must be uniform in order to provide a cylindrically symmetric meniscus shape without any perturbations due to potential and field variations. However, through electrostatic modeling (illustrated in FIG. 5), it was found that this variation in potential for arc-shaped electrodes is less than 0.1% if the insulator thickness is approximately 3 times the distance, D, between the electrode arcs. This is consistent with axisymmetric magnetic and electrostatic problem programs found in the art (see, for example, D. C. Meeker, "Finite Element Method Magnetics," Version 4.0.1, Dec. 3, 2006, http://femm.foster-miller-.net). Therefore, this problem can be solved satisfactorily by appropriate design.

It was found that a considerable difficulty in the practical implementation of liquid lenses for commercial use lies in the severely mismatched temperature coefficients of liquids (the lens material) and solids (the housing/packaging material), which in use affects the integrity of the cell and may alter the shape of the meniscus (and therefore the optical performance of the lens) in uncontrollable ways. This critical problem is addressed for the commercial applications of the invention by introducing a gas-filled plenum in communication with one of the lens liquids, which allows for the expansion and contraction of the liquids with temperature changes without creating large stresses on the liquid-lens package. For the purposes of this disclosure, the term "plenum" is intended to refer to an enclosed volume filled with a gas at some useful pressure, independently of the surrounding ambient pressure.

Accordingly, an annular gas plenum 36 (FIG. 4) is provided in this embodiment adjacent to the lower liquid around the bottom plate 24. A ridge or lip 38 in the form of a ring somewhat shallower than the height of the plenum 36 is preferably used to separate the gas in the plenum from the liquid $l_1$ in the lens cell. The thin circumferential opening between the bottom of the ridge 38 and the bottom plate 24 defines the location of the interface between the liquid and the gas. Therefore, the bottom of the ridge 38 should be sufficiently wide to accommodate the displacement of the interface that may occur during expected temperature variations, thereby avoiding spillover of the liquid $l_1$ into the gas plenum 36 or bubbling of the gas into the interior of the liquid-lens cell. As one skilled in the art would readily recognize, the gas in the plenum should also be selected with the appropriate characteristics, such as miscibility, to avoid contamination of the liquid in the cell.

Thus, according to the invention, by maintaining a pocket of gas confined to a volume outside of the optical volume, so as not to obscure the optical path, expansion and contraction of the liquids with temperature changes is accommodated without incurring large stresses in the package. Work performed with millimeter and sub-millimeter devices involving backfilled liquids and gases proved the ability to maintain gas in preferred locations by appropriately tailoring the gas cavity geometry and surface energy. The gas-plenum approach of the present invention is expected to increase considerably the ease of manufacture of liquid lenses and to obviate the need for elastic packaging components.

Liquid lenses and arrays of liquid lenses as described may be manufactured with serially-based processes using precision machining and assembly techniques. Microfabrication approaches collectively referred to in the art as HTPF (High Throughput Precision Fabrication) are ideally suited for the type of structures required by liquid lenses and have been demonstrated as viable in many applications that require precision high aspect-ratio metal structures. These processes also do not require high temperatures, allowing them to be used with liquids and plastics. See www.htmicro.com, for example, for a general description.

The HTPF processes, significantly influenced by additive microfabrication techniques, such as LIGA (Lithography, Electroforming, and Injection Molding), enable integration and batch fabrication of precision microstructures with an extensive material base. For example, metals and metal alloys such as Ni, NiFe, NiCo, NiFeCo, NiMo, NiMg, NiP, NiW, Cu, Au, Sn, Ag, and plastics such as PMMA, polyimide, and epoxy may be incorporated. Additionally, a wide variety of thermoplastics and thermosetting plastics, elastomers, as well as composites such as bonded rare-earth permanent magnet material and glass ceramics, may be used. Such material options lead to extensive alternatives in engineering material properties relative to thermal, mechanical, magnetic and corrosion requirements, for example, which in turn enables the manufacture of many new micro-scale devices that have no other means of fabrication.

Maintaining high precision at small scale becomes a critical issue for many scaled components. Accordingly, deep x-ray lithography is used to preserve 100-ppm tolerances at sub-millimeter dimensions. The basic fabrication approach also supports arbitrary multi-angled prismatic shapes. With HTPF such shapes may be incorporated into multilayer structures, with highly accommodating design rules, to enable unique assemblies of structures at the micro-scale level. The ultimate objective of this process capability is not only the simultaneous realization of extensive functionality, but also the commensurate inclusion of packaging and interface features.

Figure 6A:
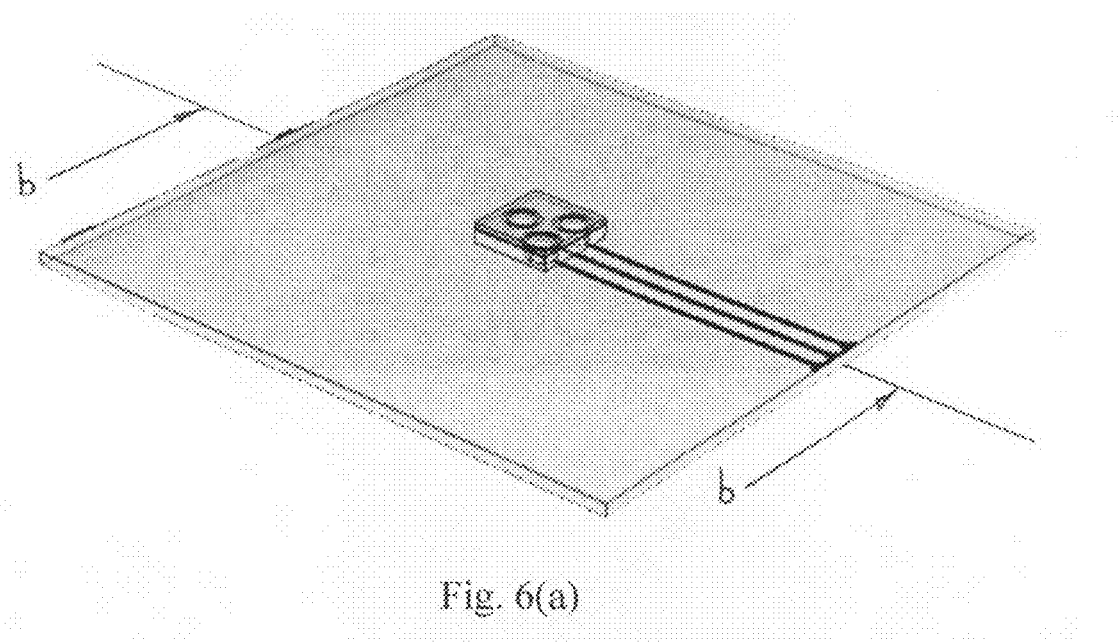
FIGS. 6(a) and 6(b) show an array of three liquid lenses on a 25-mm square optical reference plate, and a close-up cross-section taken along lines b-b, respectively.
Figure 6B:
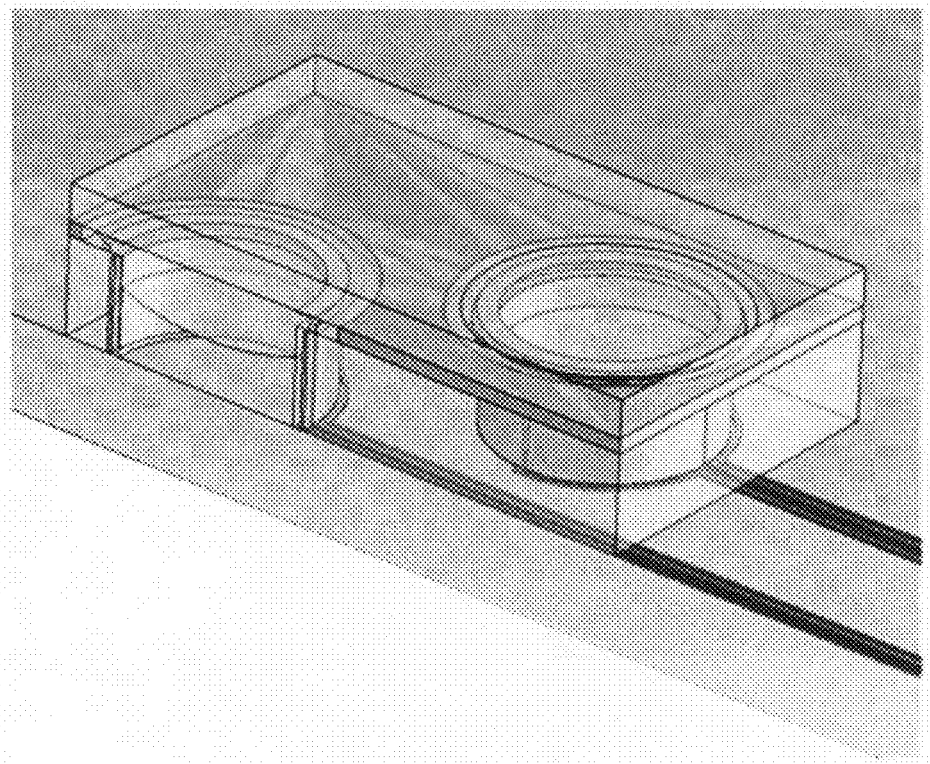

A prime advantage of batch microfabrication processes is that a myriad of devices may be fabricated simultaneously from a wafer (typically 4" or 6" in diameter). Thus, for typical liquid lens sizes, hundreds to thousands of lenses may be fabricated per wafer. This reduces manufacturing cost and also improves repeatability. Additionally, the ability to manufacture liquid lens arrays is achieved wherein all wiring may be patterned as in an integrated circuit and managed within the liquid lens packaging through batch microfabrication. An example of a three-cell array is shown in FIGS. 6(a) and (b). The fabrication of the device shown in FIGS. 4 and 6 is outlined, step by step, in FIGS. 7(a)-(h). The sequence shown depicts one lens being built from the top down (with reference to FIG. 4). Lens arrays are fabricated in the same manner.

Figure 7A:
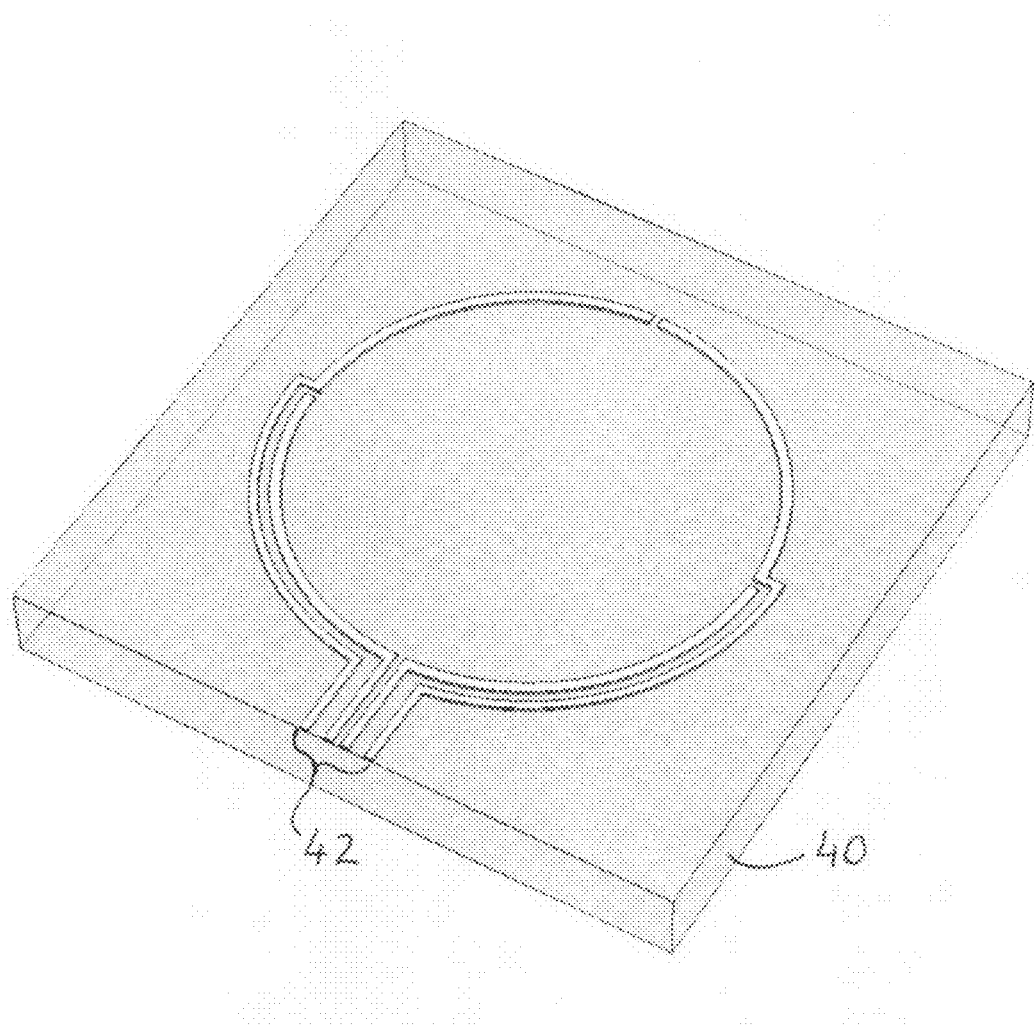
FIGS. 7(a)-7(f) illustrate the steps of fabrication of the liquid-lens cells of FIGS. 4 and 6.
Figure 7B:
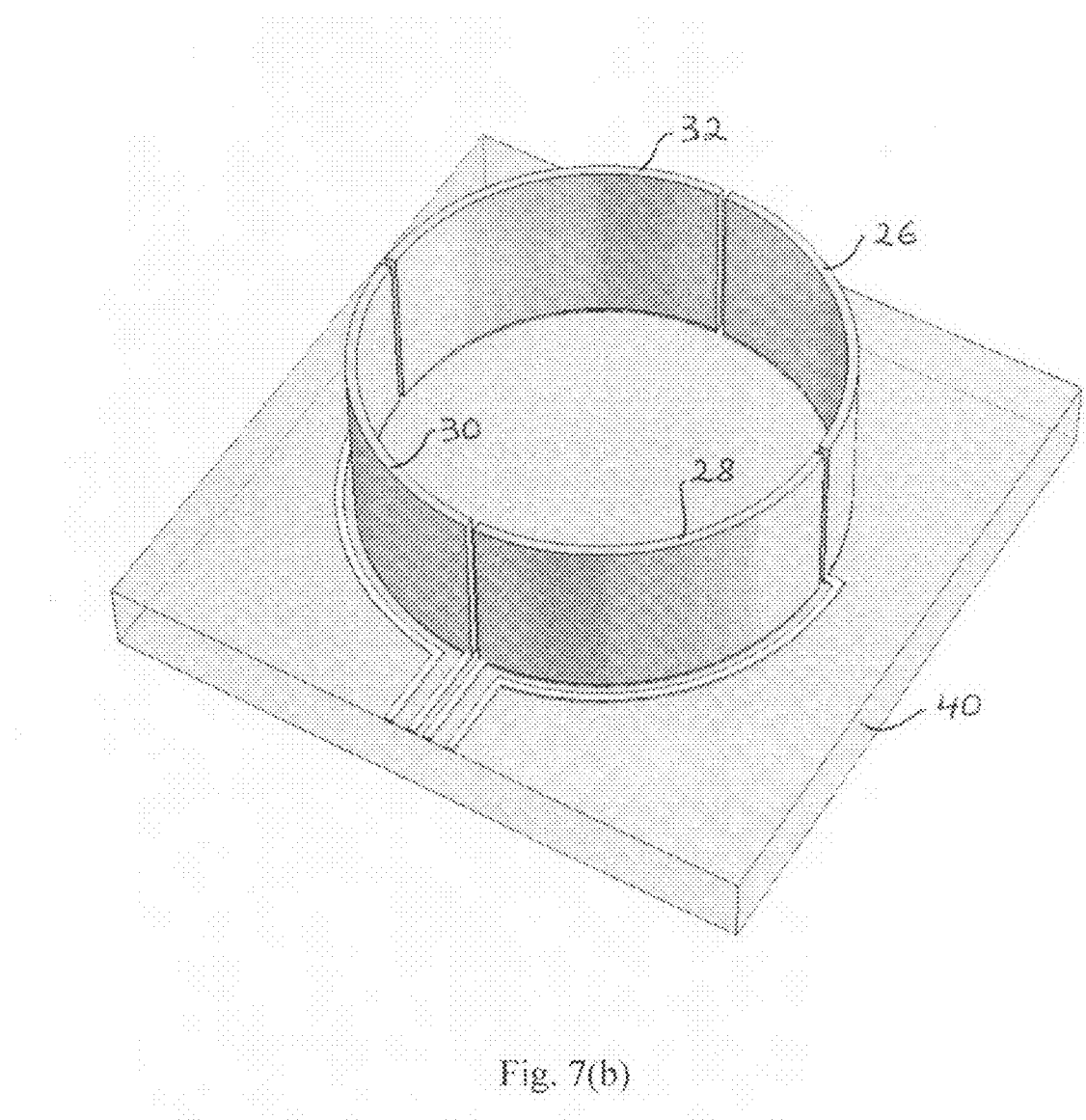
Figure 7C:
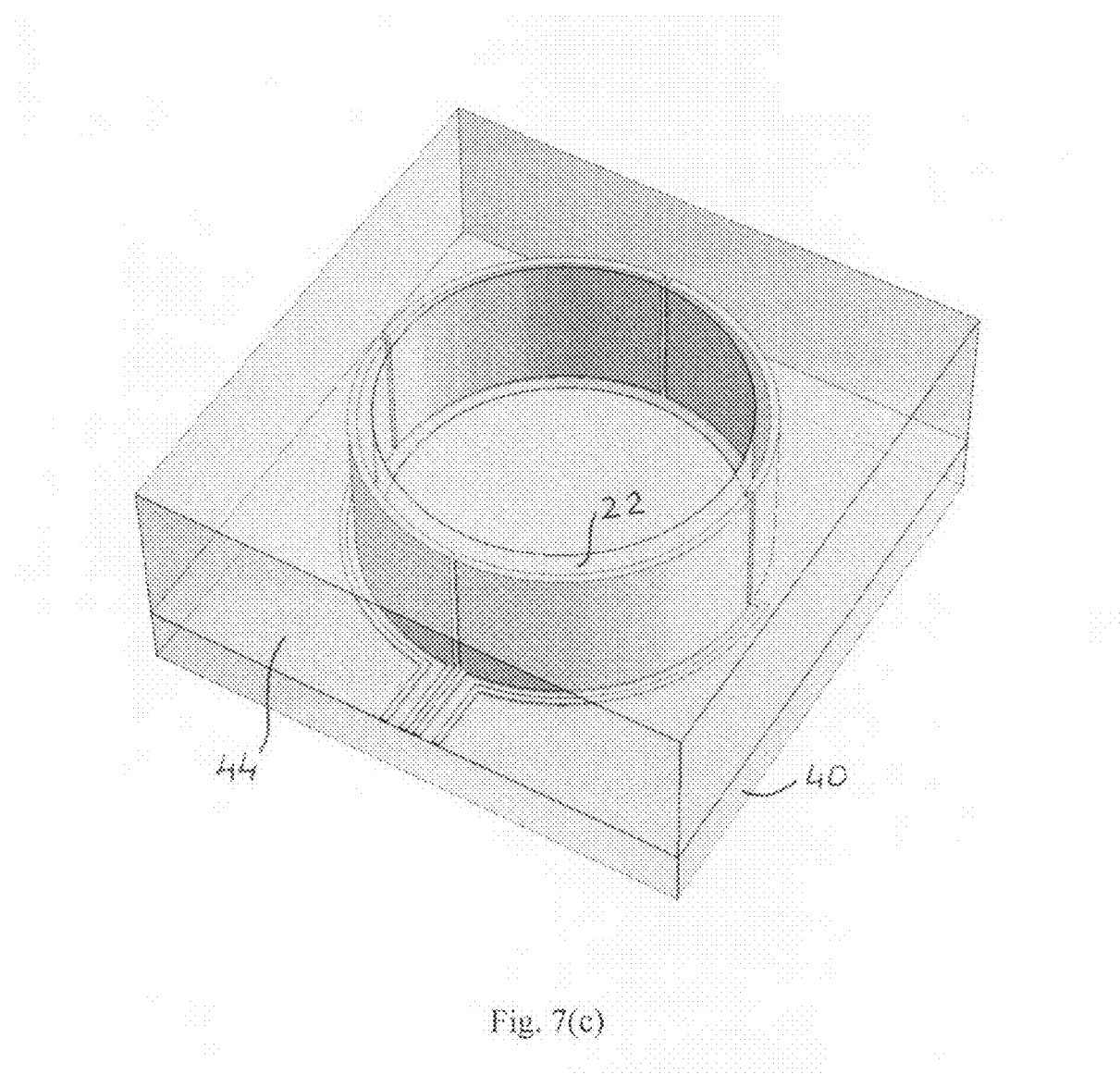
Figure 7D:
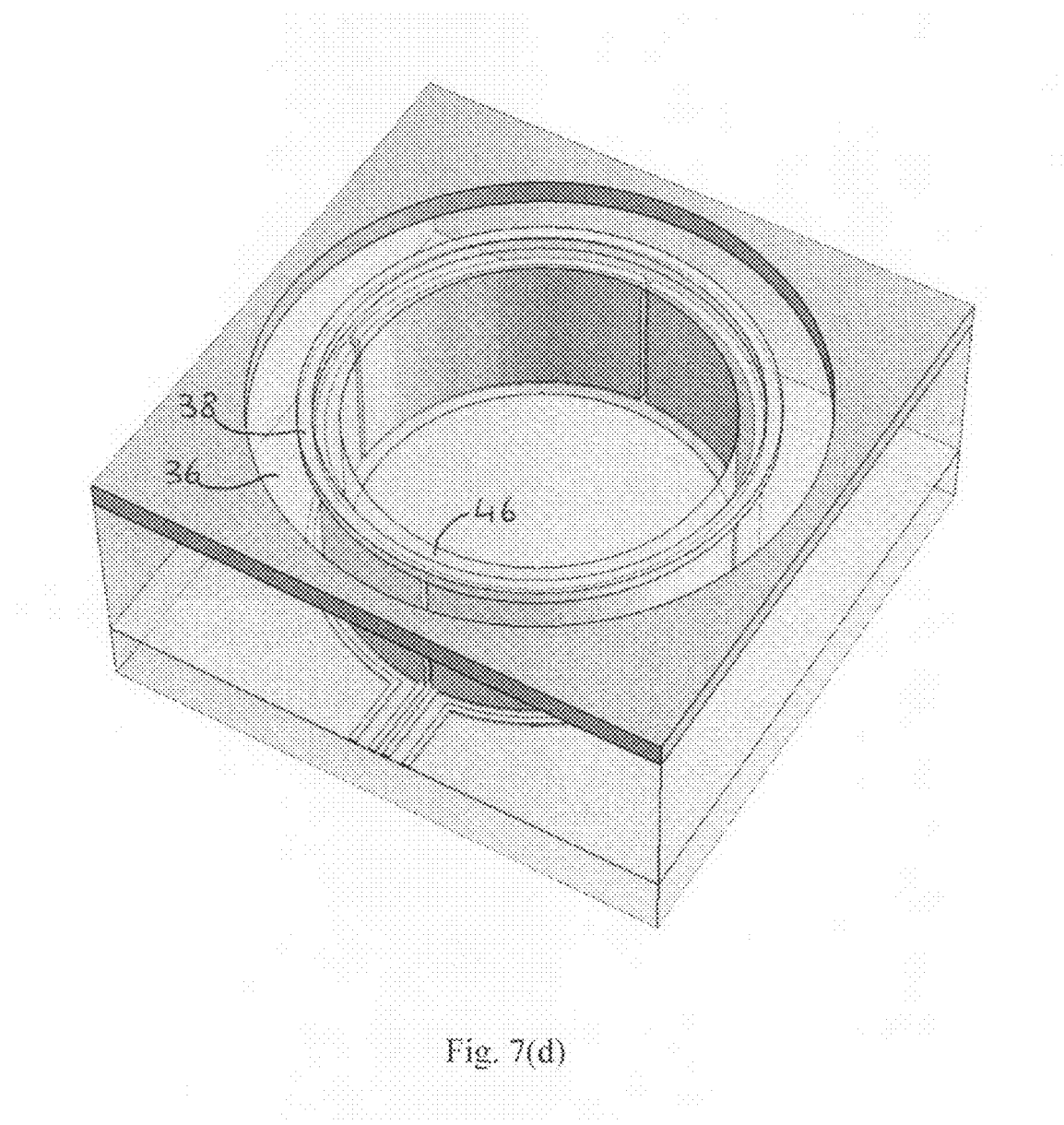

As shown in FIG. 7(a), an optically clear top substrate 40 is first metallized with a pattern 42 of electrical connections for the plurality of electrode segments (26,28,30,32 are illustrated) constituting the top cylindrical electrode of each cell. The electrode segments 26,28,30,32 are then formed in contact with respective electrical connections, as seen in FIG. 7(b), using a high-ratio aspect lithographic process. An outer insulating structure 44 and an inner insulating sleeve 22 are then formed over the electrode segments to protect and insulate the electrode and its electrical connections, as shown in FIG. 7(c). (Two layers are shown in the figure, illustrating the possible use of different materials for the formation of the plenum.) An additional coating may be deposited over the sleeve 22 in the interior of the cell using a material that modifies the wetting behaviour of the sleeve wall as desired. Alternatively, the same material may be used, if insulating, to coat the electrode segments 26,28,30,32 directly, without forming the intermediate sleeve 22. FIG. 7(d) illustrates the patterning of the gas plenum by first forming an inner circular opening 46 (see also FIG. 4) and then the outer plenum 36 by removing material from the top portions of the sleeve 22 and the insulating structure 44, thereby also forming the ridge 38, which is shaved slightly (preferably no more than a few microns) in order to create the thin opening for the liquid/gas interface.

Figure 7E:
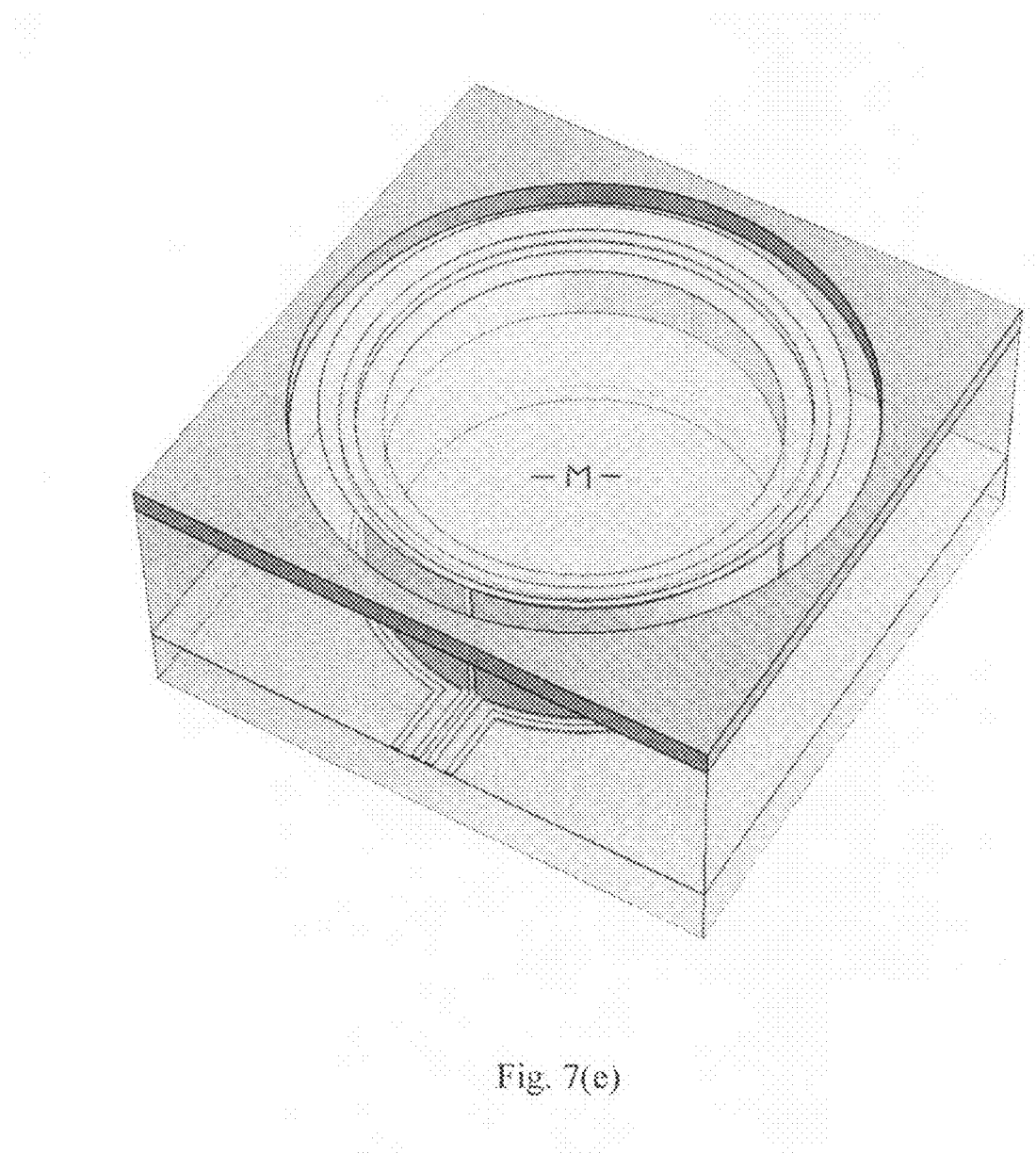

Once the structure of the bottom portion of the lens cell (with reference to FIG. 4) is so fabricated, the two liquid materials are sequentially injected into the cell ($l_1$ and $l_2$, in that order) to form the lens of the invention at meniscus M produced by their interface, as illustrated in FIG. 7(e). Note that the total liquid volume for microarray lenses is expected to be in the order of one microliter and, therefore, achievable with nanoliter pipetting. In the manufacture of arrays, the liquid dispensation may be accomplished in batch operations using electro-kinetic pipette arrays.

Figure 7F:
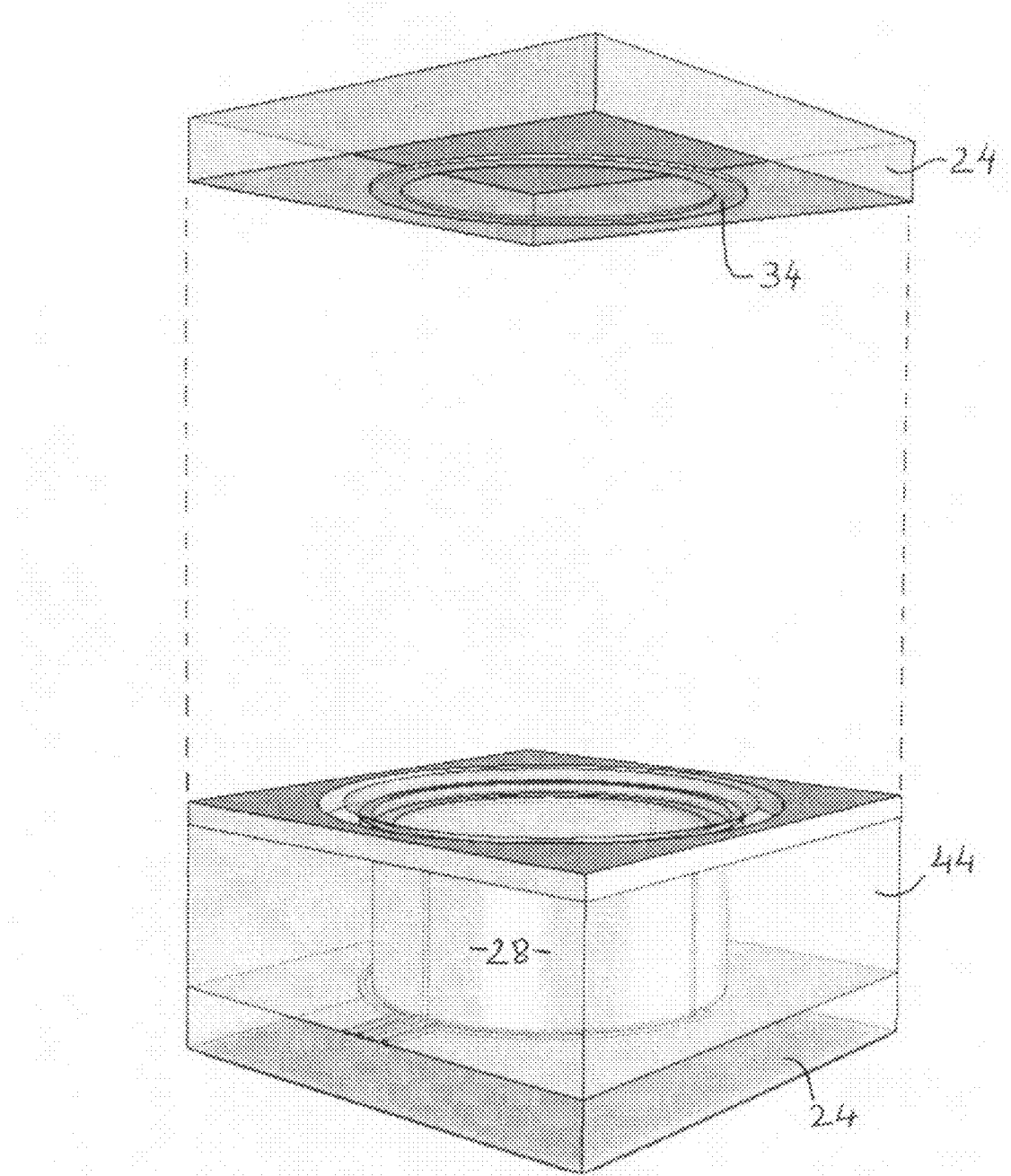

Next, as illustrated in FIG. 7(f), the bottom clear plate 24 of the cell 20, with the bottom annular electrode 34 and a corresponding electrical connection (not shown) already bonded to it, is mated to the structure of FIG. 7(e). The two components may be bonded using any conventional technique, including adhesives, liquid or vapor solvents, and thermo-compression techniques. The final result is a single cell (upside down with reference to FIG. 4), noting that the same procedure can be used to manufacture an array of cells in parallel from a larger initial optical substrate 24. The presence of the electrical connections would then permit wire bonding with standard die-attach and other conventional integrated-circuit packaging procedures.

Figure 8:
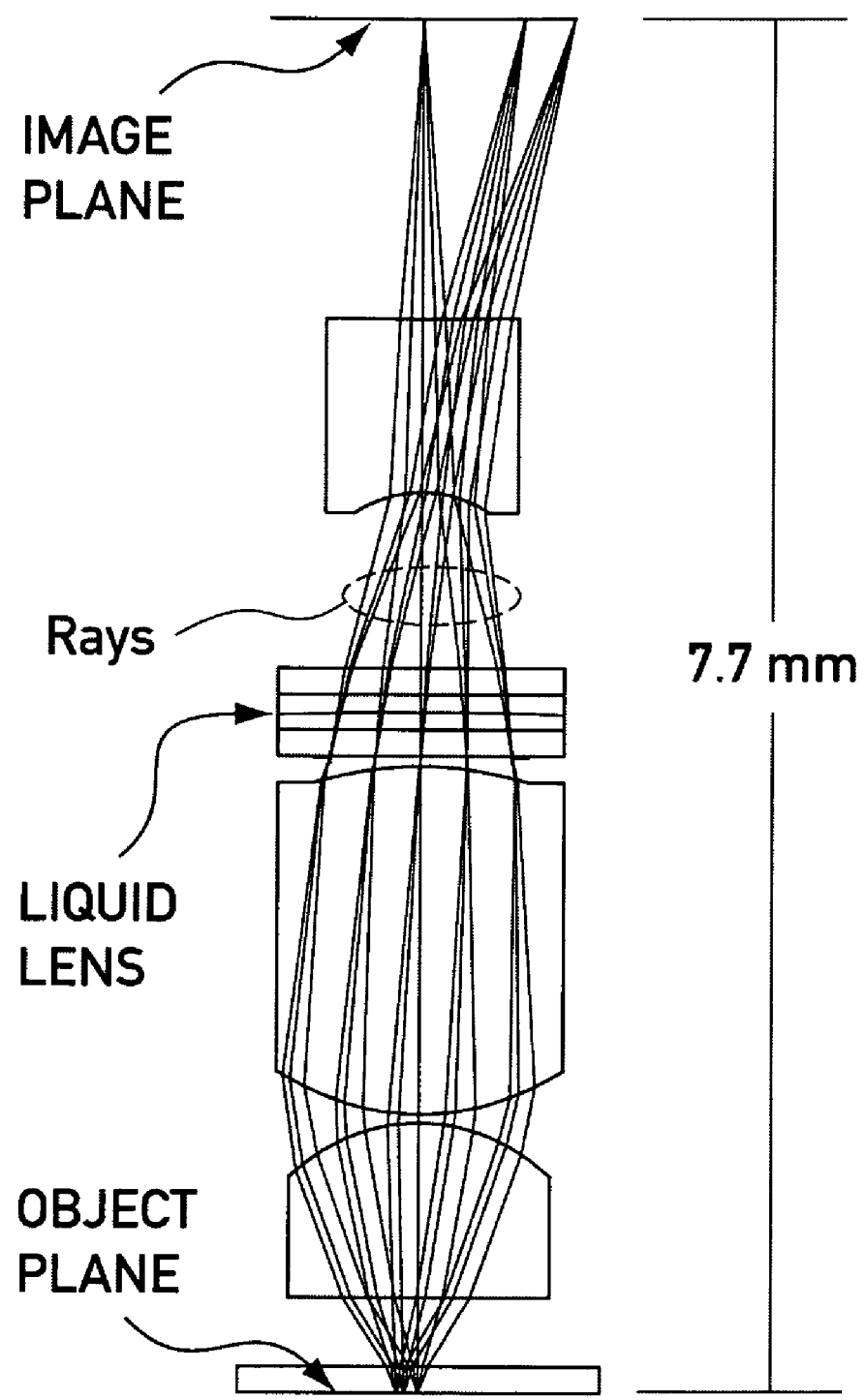
FIG. 8 is a schematic cross-section view of an individual miniature 7×/0.6 microscope objective design. One complete liquid-lens array microscope contains 120 of these objectives. Rays associated with three field positions are also shown.

A preliminary design for a liquid-lens suitable for an array-microscope according to the invention is shown in FIG. 8. Selected specifications of this optical design are listed in Table 1 below.

TABLE 1

Selected specifications of liquid-lens array microscope and an individual liquid-lens objective (FIG. 8)

| Array-Microscope Liquid Lens Whole-Slide Imager Parameter | Value |
|---|---|
| Numerical aperture (NA) | 0.6 |
| Transverse magnification | −7 |
| Array microscope full field of view (FOV) width | 26,000 µm |
| Working distance | 430 µm |
| Number of miniature objectives | 120 |
| Individual Array-Objective Parameter | |
| FOV diameter of one objective | 220 µm |
| Telecentric condition | Telecentric in object space |
| Corrected for color aberrations | 455 nm to 640 nm |
| Focus "stroke" | 14 µm |

The liquid lens of FIG. 8 is a "sandwich" structure consisting of two glass layers that contain two immiscible liquid layers. This optical design is limited only by diffraction of light in its imaging performance. This level of performance is maintained across the full extent of the array microscope's 26-mm-wide field of view at the object. The design shown in FIG. 8 is constructed from plastics and/or glasses (fixed optics) and liquids (liquid lens).

Figure 9:
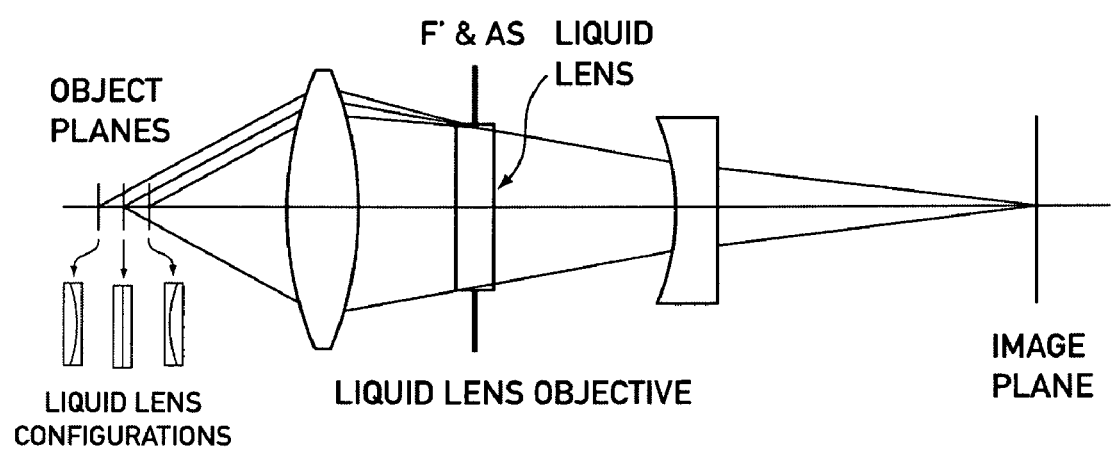
FIG. 9 is a schematic explanation of a liquid lens's effect on object plane position. Depending on the liquid-lens configuration, rays originating at different depths within a specimen follow different paths prior to the liquid lens but the same path after the liquid lens to arrive at the same image plane. The liquid lens is located at the rear focal plane (F'), coincident with the objective's aperture stop (AS). The numerical aperture and the transverse magnification remain unchanged with liquid-lens configuration if the liquid lens is located at F'.

The liquid lens of the invention in each miniature microscope objective of the array is intended for independent focusing and aberration correction. Focusing, however, must not change the transverse magnification of the microscope objective. Ordinarily, that would be impossible with a variable-power lens. However, if the variable-power lens is located at the rear focal plane of the microscope objective, as illustrated in FIG. 9, then it is possible to achieve both goals (i.e, adjustable focus and invariant transverse magnification). The situation is similar to that of eyeglasses, wherein the lenses are located at approximately the front focal plane of the eye. As a result, the wearer experiences improved vision without a noticeable change in magnification. Exchanging glasses for contact lenses, however, leads to an observable change in the perceived size of objects. That is because a contact lens changes by definition the effective focal length of the eye and thus the eye's magnification. The proposed liquid-lens devices can be viewed as "multifocal eyeglasses" for an array of microscope objectives.

In more precise terms, the liquid lens makes it possible to translate the front principal plane of the miniature microscope objective of FIG. 8 without changing the effective focal length of the objective (see FIG. 9). These geometrical optics considerations can be tested and confirmed with conventional ray tracing analysis.

The liquid lens microscope objective shown in FIG. 8 is designed to maintain the same magnification as the optical power of the liquid lens is varied. In other words, the liquid-lens element is positioned at the rear focal plane of the optical system shown in the figure. The main objective of the invention is to use a liquid-lens device that permits compensation of specimen topography and focusing at several depths within the specimen's thickness (so called "z stacking"). Based on an analysis of common tissue topography (accounting for the variation of optical thickness between the tissue and the array-microscope optics due, for example, to mounting medium thickness non-uniformity) combined with typical tissue-section thickness, the liquid-lens device needs to deliver a total focus "stroke" of about 14 microns.

Over this focus "stroke," the liquid-lens microscope objective design of FIG. 8 maintains constant magnification to better than $\frac{1}{5}^{th}$ of a pixel at the edge of the objective's field of view, where magnification change has the most noticeable effect. By further optimization of the liquid-lens microscope objective's design, it is expected that this specification may be tightened to $\frac{1}{10}^{th}$ of a pixel.

In addition to maintaining constant magnification, the design of FIG. 8 maintains high image quality over the full range of focus "stroke." In modeling, the Strehl ratio was used to estimate image quality at 1-micron increments in focus position. Strehl ratio is readily calculated in an optical-design program and indicates how close an optical system approaches the "diffraction-limited" condition. A Strehl ratio greater than 0.8 is customarily accepted as meaning diffraction limited focusing. See M. Born and E. Wolf, *Principles of Optics*, $6^{th}$ Edition, Ch. 9, p. 469 (Pergamon Press, 1989). The design of FIG. 8 exhibits a minimum Strehl ratio of 0.9 across the entire field of view and at all focus-position increments. In other words, the introduction of a liquid-lens device achieves variable focusing without sacrificing high image quality.

As mentioned, closely spaced liquid-lens cells suitable for the design of FIG. 8 may be fabricated simultaneously in an array. Using the multiple electrode arcs and gas plenum combination disclosed herein, it is possible to improve the optical meniscus surface and extend the depth of field of each objective, as desired.

However, it is important that the uniformity of the potential be maintained at the interior of the cylinder insulating layer (see FIG. 4), as discussed above, in order to provide a rotationally symmetric meniscus shape free of irregularities. Through finite-element electrostatic modeling, it was found that for arc-shaped electrodes such as those shown in FIG. 4, the variation in potential near the electrode gap is at an acceptable level of less than 0.1% if the insulating-layer thickness is approximately three (3) times the gap distance between the electrode arcs or greater. This relationship between gap distance and insulating-layer thickness is well within the capabilities of HTPF microfabrication.

As reported in Table 2 below, it is also apparent that the needed range of meniscus radius of curvature is very modest, considering the small clear-aperture diameter of the liquid lens, in order to achieve the desired focus "stroke." That is, the interface between the two liquids needs to move a total vertical distance of only 7 µm along the inner wall of the liquid-lens cell in order to shift focus over the total stroke of 14 µm.

TABLE 2

Selected specifications of the liquid lens modeled in an individual objective (FIG. 8).

| Liquid Lens Parameter | Value |
|---|---|
| Clear-aperture diameter | 1 mm (bottom), 0.9 mm (top) |
| Meniscus liquid interface radius of curvature | −39.3 mm (min) to 29.6 mm (max) |
| Liquids thickness (nominal) | 100 µm each |

TABLE 2-continued

Selected specifications of the liquid lens modeled
in an individual objective (FIG. 8).

| Liquid Lens Parameter | Value |
|---|---|
| Center-to-center spacing of liquid lenses | 1.64 mm |
| Corresponding focus "stroke" at the specimen | 14 μm |

Thus, a highly flexible array-microscope that meets high standards of image quality may be implemented with the liquid lenses of the invention. In particular, miniature liquid-lens microscope objectives can be constructed that are compatible with array-microscope manufacture and produce an image that is limited by diffraction of light and exhibits invariant magnification with focus position and invariant transverse magnification over the full focus "stroke."

For the purposes of the invention, it is desirable that the miniature objective have a numerical aperture of NA=0.65 or greater. With reference to the design of FIG. 8, the specifications required for this result are summarized in Table 3 below (as verified for the entire field of view by using ZEMAX EE ray-tracing software requiring the Strehl ratio to exceed a value of 0.75 at all field-of-view locations).

TABLE 3

Operational definitions of specifications for the high-NA miniature microscope liquid-lens objective for use in an array microscope whole-slide imager.

| Criterion | Method of Measurement |
|---|---|
| Object-space numerical aperture (NA): NA ≧ 0.65 | Real ray tracing in ZEMAX EE optical-design program |
| Field of view diameter: $d_{FOV}$ ≧ 220 μm | Real ray tracing in ZEMAX EE optical-design program |
| Telecentric in object space to within 1° at all field locations | Real ray tracing in ZEMAX EE optical-design program |
| Transverse magnification 6 ≦ |m| ≦ 10 | Real ray tracing in ZEMAX EE optical-design program |
| Maximum lens clear-aperture diameter to field-of-view diameter ratio: $d_{lens}/d_{FOV}$ ≦ 10 | Real ray tracing in ZEMAX EE optical-design program |
| Distortion ≦ 25% of sampling distance at the object at all field positions within the field of view | Real ray tracing in ZEMAX EE optical-design program |
| Working distance ≧ 375 μm | Real ray tracing in ZEMAX EE optical-design program |
| Strehl ratio ≧ 0.75 at all field positions within the field of view, at wavelengths of 455 nm, 530 nm, and 625 nm | Real ray tracing in ZEMAX EE optical-design program. Strehl ratio calculated using 37 Zernike terms. |

Thus, a system of individually controllable microscopes has been disclosed that permits the independent adjustment of each to conform to specific needs. By adjusting the voltage applied to each electrode of the individual liquid lens, the shape of its meniscus can be varied with seamless continuity to fit almost any desired shape. Accordingly, as the focus of a particular objective needs adjustment during a scan to track changes in the height of the sample surface, the adjustment can be made on the fly simply by varying the voltages applied to the respective electrodes. Similarly, each liquid lens of the array may be adjusted to make each objective of the array behave identically, not only in terms of focus, but also with regard to conjugates and to correct individual aberrations in the optics of each microscope. Furthermore, as one skilled in the art would readily understand, the array of liquid lenses could be combined with programmable optics to make any desired correction or produce any desired variation in the performance of the array.

Therefore, while the invention has been shown and described herein in what is believed to be the most practical and preferred embodiments, it is understood that departures can be made within the scope of the invention. For example, the liquid-gas interface produced by the gas plenum has been described as a circumferential slit between the lens's cell and the plenum, but arc openings, or openings of different geometries placing the cell in communication with the plenum, could work as well as long as spatially distributed so as to minimize the effect of thermal expansion on the shape of the meniscus. Thus, the invention is not to be limited to the details disclosed herein but is to be accorded the full scope of the claims so as to embrace any and all equivalent methods and products.

We claim:

1. A liquid lens comprising:
   two immiscible liquids defining a meniscus in a cell;
   two electrodes capable of generating a field across the meniscus;
   a power source connected to the two electrodes for applying a potential therebetween;
   an enclosed gas-filled plenum; and
   an insulating layer separating at least one of the two electrodes from the liquids in the cell;
   wherein at least one of the two electrodes comprises a plurality of segmented electrode components capable of producing respective variable potentials across the meniscus; at least one of said liquids has an interface with said enclosed gas-filled plenum; and said electrode components are cylinder segments separated by a gap not greater than one third of a thickness of said insulating layer.

2. The lens of claim 1, wherein another of said two electrodes is annular.

3. The lens of claim 1, wherein said lens is incorporated into a microscope objective comprising an aperture stop and is positioned at a rear focal plane thereof coincident with said objective's aperture stop.

4. The lens of claim 2, wherein said lens is incorporated into a microscope objective comprising an aperture stop and is positioned at a rear focal plane thereof coincident with the said objective's aperture stop.

5. A liquid lens comprising:
   two immiscible liquids defining a meniscus in a cell;
   two electrodes for generating a field across the meniscus;
   a power source for applying a potential between the electrodes;
   an enclosed gas-filled cavity in communication with at least one of the liquids in the cell; and
   an insulating layer separating one of the two electrodes from the liquids in the cell;
   wherein one of the two electrodes comprises a plurality of cylinder segments capable of producing respective variable potentials across the meniscus, said cylinder segments being separated by a gap not greater than one third of a thickness of said insulating layer; another of said two electrodes is annular; the lens is incorporated into a microscope objective comprising an aperture stop; and said lens is positioned at a rear focal plane of said objective coincident with the objective's aperture stop.

6. A microscope array comprising:

an array of microscope objectives, each objective including a liquid lens made of two immiscible liquids defining a meniscus in a cell, two electrodes capable of generating a field across the meniscus, means for applying in a potential between the electrodes, a gas-filled plenum having an interface with at least one of said liquids, and an insulating layer separating at least one of the electrodes from the liquids in the cell, wherein at least one of the electrodes comprises a plurality of segmented electrode components capable of producing respective variable potentials across the meniscus; and said electrode components are cylinder segments separated by a gap not greater than one third of a thickness of said insulating layer.

7. The microscope array of claim 6, wherein said lens is incorporated into a microscope objective comprising an aperture stop and is positioned at a rear focal plane of said objective coincident with the objective's aperture stop.

8. A method of liquid-lens fabrication comprising the following steps:

metallizing a substrate with a pattern of electrical connections for a plurality of electrode segments;

forming said plurality of electrode segments in contact with respective electrical connections on the substrate;

forming an outer insulating structure and an inner insulating sleeve over the electrode segments and the electrical connections, thereby defining a cell within the sleeve;

forming a plenum cavity by removing material from the outer insulating structure and providing a gas to the plenum cavity;

sequentially injecting two immiscible liquids into the cell, thereby forming a lens meniscus in the cell and providing an interface between one of the liquids and the gas in the plenum cavity; and bonding a plate containing an additional electrode and a respective electrical connection to the insulating structure, thereby enclosing the liquids within the cell and the gas in the plenum cavity.

9. The method of claim 8, further including the step of coating the sleeve with a material that modifies a wetting property of the sleeve.

10. The method of claim 8, wherein said inner insulating sleeve over the electrode segments is a material that modifies a wetting property of the sleeve.

11. The method of claim 8, wherein said plurality of electrode segments constitutes a substantially cylindrical electrode and said additional electrode is an annular electrode.

12. The method of claim 11, wherein said electrode segments are separated by a gap not greater than one third of a thickness of the insulating sleeve over the electrode segments.

* * * * *